Figure 1:
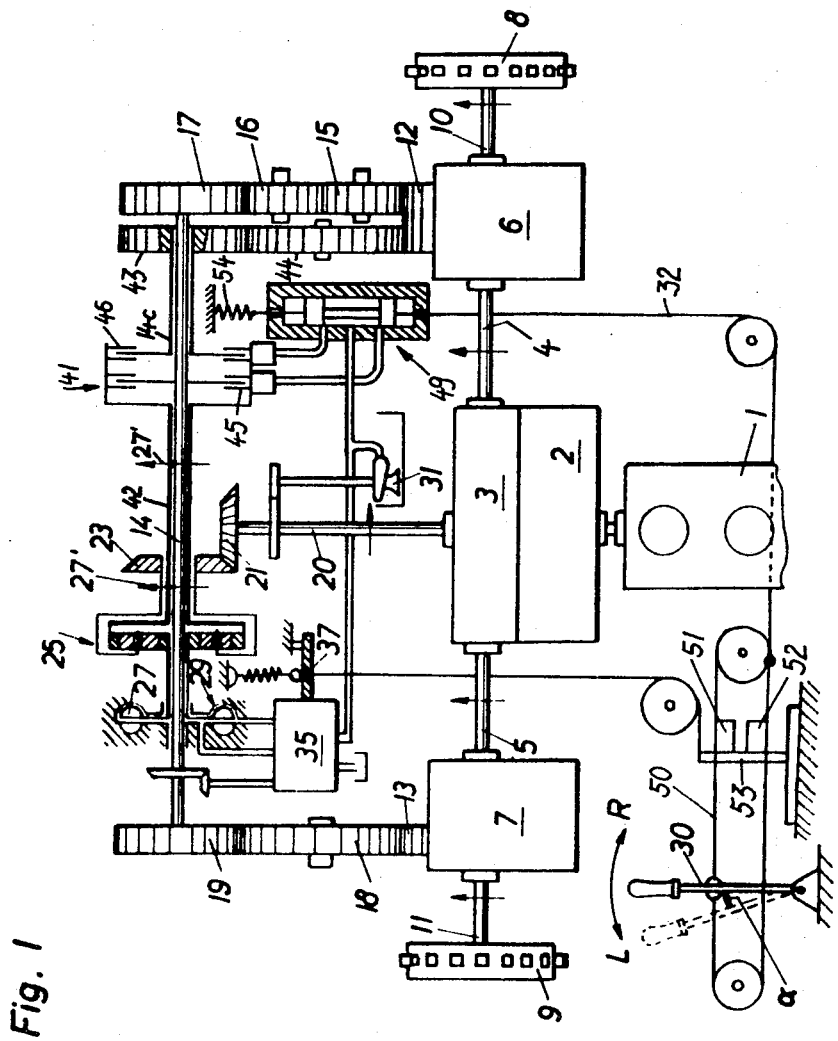

United States Patent

[11] 3,620,320

| [72] | Inventor | Waldemar Armasow |
| | | Heidenheim, Germany |
| [21] | Appl. No. | 847,195 |
| [22] | Filed | Aug. 4, 1969 |
| [45] | Patented | Nov. 16, 1971 |
| [73] | Assignee | Voith Getriebe KG |
| | | Heidenheim (Brenz), Germany |
| [32] | Priority | Aug. 8, 1968 |
| [33] | | Germany |
| [31] | | P 17 80 165.9 |

[54] STEERING DRIVE FOR TRACK-LAYING VEHICLES
13 Claims, 2 Drawing Figs.

[52] U.S. Cl. ........................................ 180/6.44,
  74/720.5, 180/6.7
[51] Int. Cl. .......................................... B62d 11/16
[50] Field of Search ............................. 180/6.2,
  6.44, 6.66, 6.7; 74/720.5

[56] References Cited
UNITED STATES PATENTS

| 3,425,296 | 2/1969 | Livezey | 74/720.5 |
| 3,450,218 | 6/1969 | Looker | 180/6.44 |
| 3,520,376 | 7/1970 | Muller | 180/6.7 |

FOREIGN PATENTS

| 438,048 | 11/1967 | Switzerland | 180/6.44 |

*Primary Examiner*—Benjamin Hersh
*Assistant Examiner*—Leslie J. Paperner
*Attorney*—Walter Becker ABSTRACT: The present invention concerns a steering transmission for track-laying vehicles, according to which the driving through a left-hand as well as a right-hand curve can be effected with a single hydrodynamic brake. To this end, the brake rotor is, by means of a double clutch, selectively connected to one or the other of two shafts interconnected by a reversing transmission. One of these shafts, or both together, form the zero shaft.

STEERING DRIVE FOR TRACK-LAYING VEHICLES

The present invention relates to a track-laying vehicle with a drive of the two chains from a distributing transmission through heterodyne transmissions respectively, the free transmission members of which support each other by a so-called zero shaft which either extends all the way through, or a zero shaft which is interrupted by a reversing transmission and stands still during straightforward drive.

The present invention more specifically relates to a track-laying vehicle as just mentioned which is provided with a steering drive operatively connected to the distributing drive for feeding the steering driving power into the steering transmission, means being provided in said steering transmission for more or less driving the zero shaft depending on the steering lever angle in one or the other direction while employing a braking power.

With track-laying vehicles of this type, for instance motor graders and similar commercial vehicles it has been suggested for each curve direction—right-hand curve and left-hand curve—or for each direction of turning of the zero shaft to be driven for driving through a curve, to provide a separate steering brake and a separate heterodyne transmission for driving said brakes. Such an arrangement, however, requires numerous structural elements for the duplex arrangement of brakes and heterodyne transmissions which fact makes itself felt in an increased price and an increasing vehicle weight and place requirement. The last-mentioned two factors are of particular importance when military track-laying vehicles are involved.

With the heretofore suggested transmission, it is necessary for purposes of stabilizing the straightforward drive, additionally to provide a friction holding brake for the zero shaft to bring about the synchronism of the two caterpillar tracks or chains. Also, this holding brake requires additional structural elements, additional weight and additional space.

It is an object of the present invention to provide a track-laying vehicle of the above-mentioned type with a steering drive, which will overcome the above-mentioned drawbacks.

It is another object of this invention to provide a track-laying vehicle with a steering drive, in which only a single hydrodynamic steering brake for both directions of turning will suffice and which will not need a second steering brake which is not used when driving through a curve.

It is still another object of this invention to provide a track laying vehicle as set forth in the preceding paragraph which will not require any additional holding brakes for the zero shaft for purposes of stabilizing the driving direction when driving straightforwardly.

These and other objects and advantages of the invention will appear more clearly from the following specification in connection with the accompanying drawings, in which:

FIG. 1 diagrammatically illustrates the steering transmission according to the invention for a track-laying vehicle with a continuous zero shaft and with an auxiliary zero shaft.

Figure 2:
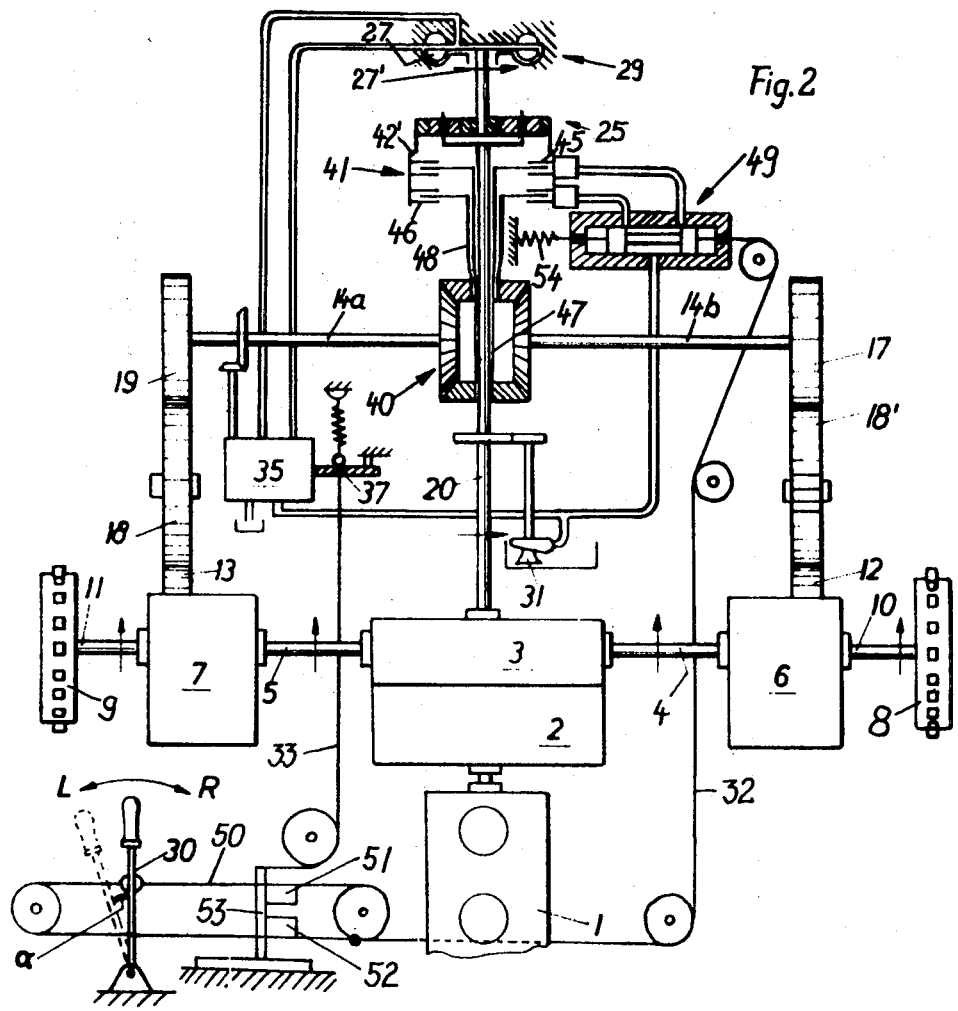

FIG. 2 diagrammatically illustrates a modified steering transmission with a zero shaft interrupted by a reversing transmission.

The above-outlined objects have been realized according to the present invention, which is characterized primarily in that if the track-laying vehicle has a continuous zero shaft, there is provided in addition to the said zero shaft an auxiliary zero shaft connected to said first-mentioned zero shaft through a reversing transmission while being of the same strength as said first-mentioned zero shaft. If the zero shaft is interrupted by a reversing transmission, two shafts rotating in opposite direction with regard to each other extend from said reversing transmission while the two shafts extending from the reversing transmission are respectively provided with friction clutches for connecting one end or the other of the two shafts to a common shaft.

The invention is furthermore characterized in that a single heterodyne transmission is provided, of which one main member is operatively connected to the clutches while its other main member is operatively connected to the rotor of a single brake with slip (electrodynamic or hydrodynamic brake), and while a third main member is operatively connected to the steering drive shaft extending from the distributing transmission.

As a result of these features, a monodirectional zero shaft is introduced into the steering transmission which when driving through a curve is driven in one direction of rotation only. This monodirectional zero shaft drives through the intervention of a double clutch serving as reversing control clutch, depending on the desired direction of turning, either the zero shaft, or the auxiliary zero shaft, or one or the other part of the interrupted shaft. The direction of turning is, by means of this steering transmission, not determined as was the case previously by the selection of a corresponding turning direction at the input, but by the selection of corresponding control positions of a reversing clutch. Inasmuch as zero shaft and auxiliary zero shaft or the two parts of the zero shaft are operatively connected to each other through the intervention of a reversing transmission, that part which is not directly driven by the steering brake is, in opposite direction, put into rotation through the intervention of the reversing transmission so that on one chain or track a positive and on the other chain or track a negative superimposition of a circumferential speed will occur.

During straightforward drive when the zero shaft and the auxiliary shaft or both parts of the interrupted zero shaft are at a standstill, both clutches to be operated individually of the friction double clutch are closed. As a result thereof, an undesired movement of the zero shaft is blocked and a complete synchronism of the tracks or chain will be assured also when the ground below the chains or tracks is uneven. If it is desired to drive through a curve, one of the clutches of the double clutches open so that the blocking of the zero shaft is lifted. Through the intervention of the still closed clutch, the output shaft of the heterodyne transmission which is now driven in view of the now-engaged steering brake, is connected with that part of the zero shaft which for the desired curve has to have the direction of rotation of the braking motor. The two clutches of the double clutch have first to be able in closed condition to transmit the full torque required at the speed of rotation of the double curve for purposes of steering, but they are subjected only to a minor wear because they have to transmit a torque only in completely closed condition and at a standstill and an emptied hydraulic brake can always be engaged. Even if a sudden change from left to rightward drive occurs, the vehicle passes through a point with infinitely large curved radius, i.e. a point at which the zero shaft and the suspended parts will be at a standstill. This position is, by the caterpillar tracks, conveyed to the transmission parts of the steering transmission because when the braking moment of the steering brake subsides or is reduced, the vehicle, in view of the high steering resistance from the ground will be driven to the less energy requiring straightforward drive with equally fast running tracks and with the steering transmission at a standstill. The transmission standstill which facilitates the engagement of the clutches of the duplex clutch therefore does not have to be brought about by a friction slip of the friction clutches, but is forced upon the transmission from the driving resistance encountered by the vehicle and through the intervention of the driving wheels. The straightforward drive, assuming approximately similar ground conditions underneath both tracks will represent the stable driving condition of such vehicles. After emptying the brake, the vehicle will by itself return to the straightforward driving position. If, for instance, a big stone is located in the path of one track and consequently the rolling resistance of this track will be considerably higher than the rolling resistance of the other track, while said first-mentioned resistance increases instantaneously, it is necessary so to design the clutches that they have a sufficiently high freeing moment to assure that also under the described driving conditions a synchronism of both tracks will be assured.

Referring now to the drawings in detail, the driving energy is conveyed from the motor 1 through the control transmission 2 which is coupled to motor to the distributing transmission 3 flanged to the control transmission 2. From here the two shafts, 4 and 5, conveying the power uniformly distributed to these two shafts is conveyed to the heterodyne transmissions 6 and 7 which are arranged so as to form an image to each other and respectively connected to a main transmission part. The driving axles 10 and 11 respectively leading to the driving wheels 8 and 9 are respectively connected to the two main transmission parts of the differential transmissions 6 and 7. The two third main transmission parts 12 and 13 are in the steering transmission according to FIG. 1 rigidly supported against each other by means of the zero shaft 14 which extends parallel to the shafts 4 and 5 and the driving axles 10 and 11 and by means of the gears 15, 16, 17, 18, and 19. In the transmission according to FIG. 2 with a zero shaft interrupted or divided by the bevel gear reversing transmission 40 into the zero shaft sections 14a and 14b, the mutual support of the heterodyne members 12 and 13 of the heterodyne transmissions 6 and 7 is effected by means of the gears 18 and 19, the left portion 14a of the divided zero shaft, the reversing transmission 40, the right-hand part 14b of the zero shaft and the gears 17 and 18'. When the drive is under load, the gears 12 and 13 have the tendency both to rotate in the same direction and at the same power in order to prevent this, the gears 12 and 13 are in the manner described above rigidly supported against each other through a reversing drive with the transmission ratio of 1:1. When in driving straightforwardly, i.e. when both driving wheels 8 and 9 have the same circumferential speed, the zero shaft is at a standstill because the tooth flank pressures onto the gears 12 and 13 are generally of the same magnitude.

If the zero shaft or the left part of the zero shaft is rotated in one direction, the gear 13 is driven in the same direction, and the gear 12 is at the same speed as gear 13 driven in the opposite direction. As a result thereof, the speed of one driving gear is increased by a certain amount proportional to the speed of the zero shaft, and the speed of the other gear is reduced to the same extent and vice versa depending on the direction of rotation of the zero shaft 14 or the zero shaft part 14a In view of this differential speed of the driving gears, a drive of the track-laying vehicle through a curve will be effected. The higher the speed of the zero shaft, the greater will be the difference in the speed of one gear relative to the other gear, and the greater will be the curvature of the curve. This interdependency is linear.

In order to bring about a difference in speed of the tracks, it is necessary to drive the zero shaft. To this end, depending on the condition of the ground and the radius of the curvature, a greater or smaller portion of the driving power is necessary. The drive of the zero shaft 14 is effected by the pitman shaft 20 which passes directly from the motor to the distributing transmission, shaft 20 rotating at a speed proportional to the speed of rotation of the motor 1. With the steering transmission according to FIG. 1, the pitman shaft drives the rotor 27 of the hydrodynamic brake 29 through the bevel gear 21, 23 and the heterodyne transmission 25 in the form of a spur gear planetary gear drive. With the steering transmission according to FIG. 2, the heterodyne transmission is driven directly by the pitman shaft 20. The hollow gears of the planetary gear transmission 25 shown in FIGS. 1 and 2 are fixedly connected to the double clutch 41. According to FIG. 1, this connection is effected through the hollow shaft 42. According to the steering transmission of FIG. 2, the clutch bell is connected to the hollow gear through the intervention of a ring 42' corresponding to the hollow shaft 42. This monodirectional zero shaft is, when driving through a curve, driven in the direction of the brake rotor 27, i.e. the direction of the arrow 27'. The planetary gear carriers are driven from the pitman shaft 20, and the output to the brake rotor 27 is effected from the sun wheel. When driving straightforwardly, in other words, when the zero shaft is at a standstill, the brake rotor 27 will rotate at a speed which is proportional to the speed of the motor. This means that also within lower velocity ranges, at low vehicle speeds the brake will have a high braking capacity.

The steering transmission according to FIG. 1 comprises an auxiliary zero shaft 14c which is coupled to the heterodyne gear 12 of the heterodyne transmission 6 through a three-wheel spur gear chain 43, 44, 12, which moves in a direction counter to the direction of movement of the gear chain 17, 16, 15, 12. Zero shaft 14 and auxiliary shaft 14c of FIG. 1 have their equivalent in the two parts 14a and 14b of the divided zero shaft of FIG. 2. The coupling of the zero shaft 14c to the gear 12 in an opposite direction with regard to the zero shaft 14 by means of the three gears, 43, 44, 12 in FIG. 1, functioning as reversing transmission corresponds to the connection of the zero shaft parts 14a, 14b through the bevel gear reversing transmission 40 in FIG. 2. The double clutch 41, which is connected to the monodirectional zero shaft, has two disc clutches 44 and 46 which are adapted to be actuated independently of each other. The clutches are actuated hydraulically and are so designed that they are open when in a pressureless condition and firmly closed when being subjected to pressure. During the straightforward drive, i.e. when the steering transmission is at a standstill, those parts of the zero shaft which move in countercurrent direction to each other are blocked at their standstill position by means of this double clutch. With the steering transmission according to FIG. 1, one clutch of the double clutch is fixedly connected with the zero shaft 14, whereas the other clutch is fixedly connected to the auxiliary zero shaft 14c. With the transmission according to FIG. 2, two shafts 47 and 48 rotating in opposite direction from each other lead out of the reversing transmission and are connected to one clutch each of the double clutch 41.

The steering transmission according to the invention is adapted at its output 42, 42', by means of the double clutch 41 selectively to drive one or the other part of a zero shaft construction, the parts of which are rotating in opposite direction with regard to each other.

When the brake 29 is pulled, the sun gear pertaining thereto is retarded. The monodirectional zero shaft 42, 42' is accelerated from its standstill in proportion to the decrease in speed of the sun gear in conformity with the inner transmission ratio of the planetary gear transmission 25. This acceleration is effected in the direction of the arrow 27', i.e. in the direction of rotation of the braking rotor. This rotational velocity is superimposed upon that of the driving gears in such a way that with one gear it will act in an additive manner and with the other gear it will act in a subtractive manner. The vehicle will then pass through a curve.

The opening of one of the clutches 45 and 46 to be released and the filling of the brake 29 and thereby the drive through a curve is controlled by the control stick 30. By means of cables 32, 33, a reversing valve 49 is actuated depending on the direction (left-hand or right-hand) of the movement of the control stick (minus or plus) while independently of the direction of the control lever movement, a filling and/or pressure control device 35 is actuated. By means of the abutments 51 and 52 arranged on the closed cable loop 50, said abutments being located opposite to each other, the follower 53 and thereby the cable 33 leading to the braking power control device 35 is actuated in the same manner independently of the direction of the steering lever movement. The control device 35 adjusts the degree of filling and/or the pressure in the pertaining brake 29 in such a way that proportional to the movement of the stick 30 or lever 37, the speed of shaft 42 or coupling bell of the double clutch 41 is constant as to time. Through the intervention of a bevel gear transmission, the control device will receive its control magnitude, the zero shaft speed. Another possibility of conveying this speed in an analogous magnitude to the control device consists in causing the delivery of a volumetric pump driven by the zero shaft 42 and having a throttled bypass on the pressure side, to act upon a piston surface. The piston force will then be at the fixed ratio to the speed of the zero shaft. The control is supplied with working fluid for the hydrodynamic brake, said working fluid being delivered by a filling pump 31 which is driven from the pitman shaft 20. The hydrodynamic brake is connected to the speed governor or control by means of a filling and return line.

In view of the control characteristic of the speed governor with regard to timewise constant speed of the pertaining braking rotor is, in spite of varying driving resistances at the tracks constant so that also the curve radius of the vehicle will be constant.

The reversing valve 49 is actuated by the control lever angle in conformity with the direction. This is effected more specifically by the fact that the cable line 32 leading to the reversing valve is at one side connected to the closed cable loop 50 which is coupled to the control lever, and furthermore at the other end there is provided a returning spring 54 on the piston of the reversing valve.

The reversing valve is, as shown in the illustrated examples for purposes of simplicity, likewise provided with oil under pressure from the filling pump 31. This oil under pressure is, for instance, with the control stick occupying its R position conveyed only to the clutch 45 and accordingly holds only this clutch in closed condition, whereas the pressure oil supply to the clutch 46 is interrupted, and the latter is opened. In this way, the zero shaft 14 or intermediate shaft 47 is driven through its clutch in the direction of the arrow 27' of shaft 42 and 42' respectively. Thus, an additional circumferential speed is positively superimposed upon the left driving wheel, whereas at the other driving wheel 8, the same amount of circumferential speed is deducted. In this way, a drive through a right-hand curve is effected. The above operations are effected analogously when driving through a left-hand curve.

From the foregoing it will be appreciated that transmission 6 and 7 may be similar to the transmission 25. Each transmission 6, 7 has an input element driven by the engine and an output element connected to the respective ground engaging member 8, 9. Each transmission 6, 7 also has a reaction element connected to a respective gear 12, 13 which, when stationary, provides for predetermined speed ratio between the respective input and output elements. Rotation of each reaction element in one direction adjusts the speed ratio of the respective transmission in one direction, while rotation of each reaction element in the other direction adjusts the speed ratio of the respective transmission in the other direction. The amount of change in the speed ratio due to rotation of any one of said reaction elements is in direct proportion to the speed of rotation of the respective reaction element.

The primary advantages of the invention are seen in the fact that a hydrodynamic brake is saved and a heterodyne transmission for driving said brake. Furthermore, additional holding brakes for the zero shaft are saved. In other words, a friction-stabilizing brake for straightforward drive becomes unnecessary.

It is, of course, to be understood that the present invention is, by no means, limited to the particular showing in the drawings but also comprises any modifications within the scope of the appended claims.

What is claimed is:

1. In a vehicle having ground-engaging members at the opposite sides adapted for being driven at the same speed to drive the vehicle in a straight line and at different speeds to cause the vehicle to turn: an engine, power-conveying means driven by said engine and having an output shaft for each ground engaging member, said output shafts rotating in the same direction and at the same speed, a differential transmission for each ground-engaging member having an output element connected to the respective ground-engaging member and an input element connected to the respective said output shaft and a reaction element rotatable in a first direction to increase the speed of the pertaining output element relative to the speed of the pertaining input element when said reaction member is at a standstill and in a second direction to decrease the speed of the pertaining output element relative to the speed of the pertaining input element, a one-to-one drive connecting said reaction elements and arranged so rotation of either reaction element in its said first direction will be accompanied by rotation of the other thereof in its said second direction and at the same speed, counterrotating drive means connected to said one-to-one drive, control means connected in controlling relation to said counterrotating drive means for selectively actuating said counterrotating drive means in a selected direction to operate said vehicle with turning thereof and for halting said counterrotating drive means to operate the vehicle without turning thereof, said control means comprising a differential having an input member driven by said engine and also having an output member and a reaction member, first and second clutches interposed between said output member and said counterrotating drive means individually energizable to provide for respectively opposite directions of rotation of said one-to-one drive and both energizable to lock said counterrotating drive means against rotation, and a variable brake connected to said reaction member, said control means further comprising a lever having a neutral position, means establishing connection relative to neutral position of said lever wherein both of said clutches are energized and said variable brake is unactuated while said lever is in the neutral position, and additional means establishing further connection due to said lever being moveable from said neutral position in opposite directions to deenergize respective ones of said clutches, said lever being operable upon said latter additional means to actuate said variable brake to a degree conforming to the amount of movement of said lever in either direction from said central neutral position.

2. A vehicle according to claim 1, in which said differential provides for a speed increase from said input member to said output member.

3. A vehicle according to claim 1 in which said one-to-one drive comprises a zero shaft and counteracting gearing connecting said zero shaft with said reaction elements, said counterrotating drive means comprising said zero shaft and a tubular shaft surrounding said zero shaft, said first and second clutches having a common part connected to said output member of said differential, said first clutch having a second part to said zero shaft and said second clutch having a second part connected to said tubular shaft, said tubular shaft being connected by reversing drive means to said zero shaft.

4. A vehicle according to claim 3, which includes gearing connecting said tubular shaft to one of said reaction elements and arranged so that rotation of said tubular shaft in one direction will actuate said one reaction member in its said first direction, while rotation of said zero shaft in the same said direction will actuate said one reaction member in its said second direction.

5. A vehicle according to claim 1, in which said differential is in the form of a planetary gear transmission having a sun gear, planet gears on a carrier, and a ring gear, said sun gear forming the reaction member connected to said variable brake, said ring gear forming the output member connected to said first and second clutches and said carrier forming said input member driven by said engine.

6. A vehicle according to claim 1, in which said one-to-one drive comprises coaxial shaft members geared to respective ones of said reaction elements, a first bevel gear on each shaft member, coaxial second bevel gears meshing with said first bevel gears, said first and second clutches having a common first part connected to said output member of said differential, said first clutch having a second part connected to one of said second bevel gears and said second clutch having a second part connected to the other of said second bevel gears.

7. A vehicle according to claim 6, in which the connections of said second clutch parts to the respective second bevel gears is in the form of telescopically arranged tubular shafts and the drive from said engine to the said input member of said differential is in the form of a shaft extending axially through said tubular shafts.

8. A vehicle according to claim 1, in which said variable brake is in the form of a hydrodynamic brake and said first and second clutches are in the form of hydraulically actuated friction clutches.

9. A vehicle according to claim 8, in which said hydrodynamic brake is variable filled to effect variable actuation thereof.

10. In a vehicle having ground-engaging members at the opposite sides adapted for being driven at the same speed to drive the vehicle in a straight line and at different speeds to cause the vehicle to turn: an engine, power-conveying means driven by said engine and having an output shaft for each ground-engaging member, said output shafts rotating in the same direction and at the same speed, a differential transmission for each ground-engaging member having an input element connected to the respective said output shaft and an output element connected to the the respective ground-engaging member and a reaction element rotatable in a first direction to increase and in a second direction to decrease the speed of the pertaining output element relative to that of the pertaining input element, a reversing drive means connecting said reaction elements, said reversing drive means having two counterrotating drive means, first and second clutches, the incoming parts of said clutches being rotatable in the same direction and connected to a common control drive means, either outgoing part of said clutches being fixed on one of said counterrotating drive means, said clutches being individually energizable to provide for respectively opposite directions of rotation of said reversing drive means to operate said vehicle with turning thereof and said clutches being commonly energizable to lock said reversing drive means against rotation to operate said vehicle in straight direction.

11. A vehicle according to claim 10, in which said control drive means comprises a differential transmission having an input member driven by said engine, an output member being connected to said incoming parts of said clutches and a reaction member being connected to a variable brake, said vehicle comprising a lever having a neutral position wherein both of said clutches are energized and said variable brake is unactuated and being moveable from said neutral position in opposite directions to deenergize respective ones of said clutches, said lever being operable to actuate said variable brake to a degree conforming to the amount of movement of said lever in either direction from said central position.

12. A vehicle according to claim 10, in which said reversing drive means comprises a zero shaft and a tubular shaft surrounding said zero shaft and being connected by a further reversing drive means to said zero shaft, said outgoing part of said first clutch being connected to said zero shaft and said outgoing part of said second clutch being connected to said tubular shaft, said incoming parts of said first and second clutches forming a common part.

13. The method of controlling the direction of movement of a vehicle having ground-engaging drive members on opposite sides, said vehicle also having an engine and a power flow path from the engine to each drive member and each power flow path having a differential transmission therein with a reaction member rotatable in opposite directions to increase or decrease the speed, respectively, of the drive member relative to that of the engine, one-to-one reversing drive means, interconnecting said reaction members so rotation of one in one direction will cause rotation of the other in the other direction, counterrotating shafts each drivingly connected to said reversing drive means, a variable brake, the rotor of said brake being driven through a differential, the reaction member of said differential being connected to a common first part of two clutches the second parts of the clutches being connected to the counterrotating shafts, respectively, the method consisting in closing both of said clutches when driving the vehicle in straight direction and releasing one of said clutches and actuating said variable brake and controlling the rotational speed of said rotor when turning right and releasing the other of said clutches and again actuating said variable brake and controlling the rotational speed of said rotor when turning left, the rotational speed of said rotor being a measure for the curvature of turning in both cases turning right or left.

* * * * *